US011950666B2

(12) United States Patent
Burton

(10) Patent No.: US 11,950,666 B2
(45) Date of Patent: Apr. 9, 2024

(54) METHOD OF MANUFACTURING JEWELRY WITH ARTIFACTS SUCH AS CREMATION ASHES EMBEDDED THEREIN

(71) Applicant: EverWith Ltd, Gloucester (GB)

(72) Inventor: Jonathan Burton, Milton Keynes (GB)

(73) Assignee: EverWith Ltd., Gloucester (GB)

( * ) Notice: Subject to any disclaimer, the term of this patent is extended or adjusted under 35 U.S.C. 154(b) by 163 days.

(21) Appl. No.: 17/322,422

(22) Filed: May 17, 2021

(65) Prior Publication Data

US 2022/0361637 A1 Nov. 17, 2022

(51) Int. Cl.

| | |
|---|---|
| ***C23C 16/48*** | (2006.01) |
| ***A44C 5/00*** | (2006.01) |
| ***A44C 7/00*** | (2006.01) |
| ***A44C 9/00*** | (2006.01) |
| ***A44C 17/00*** | (2006.01) |
| ***A44C 27/00*** | (2006.01) |
| ***A61G 17/00*** | (2006.01) |

(52) U.S. Cl.

CPC .............. *A44C 27/007* (2013.01); *A44C 5/00* (2013.01); *A44C 7/00* (2013.01); *A44C 9/0053* (2013.01); *A44C 17/006* (2013.01); *A61G 17/00* (2013.01)

(58) Field of Classification Search

CPC ... A44C 17/006; A44C 27/007; C23C 16/482; C23C 16/483

See application file for complete search history.

(56) References Cited

U.S. PATENT DOCUMENTS

| | | | | |
|---|---|---|---|---|
| 5,158,174 | A * | 10/1992 | Hereford | A44C 25/002 63/3 |
| 5,208,957 | A | 5/1993 | Hereford | |
| 6,200,507 | B1 * | 3/2001 | Dennis | E04H 13/008 264/331.19 |
| 6,227,284 | B1 * | 5/2001 | Cannon | B22C 9/04 164/516 |
| 6,382,111 | B1 | 5/2002 | Hojaji | |
| 6,615,463 | B1 | 9/2003 | Hojaji | |
| 9,168,573 | B2 | 10/2015 | Hojaji | |
| 9,433,267 | B1 * | 9/2016 | Browne | B44C 5/005 |
| 9,801,433 | B2 | 10/2017 | Murphy | |
| 10,517,360 | B1 | 12/2019 | Bethany | |
| 10,820,670 | B2 | 11/2020 | Christensen | |
| 2003/0017932 | A1 * | 1/2003 | VandenBiesen | C30B 23/00 501/86 |
| 2007/0000351 | A1 | 1/2007 | Brennan | |
| 2010/0005835 | A1 | 1/2010 | Johnson, Sr. | |

(Continued)

FOREIGN PATENT DOCUMENTS

| | | | | |
|---|---|---|---|---|
| JP | 10-323934 | * 12/1998 | | B32B 15/08 |

*Primary Examiner* — Bret P Chen

(74) *Attorney, Agent, or Firm* — OLIVE & OLIVE, P.A.

(57) ABSTRACT

A method includes the selection of a jewelry blank having a chamber for receiving a gem. The chamber is partially filled with a first layer of UV resin. Cremation remains are placed within the first layer of resin or on the surface of the first layer of resin. Then, UV light is used to cure the first layer of resin. A second layer of resin partially fills the remaining void and is cured. Diamond dust may be added to the top surface of the cured second layer. A final layer of protective resin is added into the remaining space of the chamber and cured to create the finished jewelry piece.

10 Claims, 2 Drawing Sheets

(56) References Cited

U.S. PATENT DOCUMENTS

| | | | | |
|---|---|---|---|---|
| 2014/0026377 | A1* | 1/2014 | Rojdev | A61G 17/04 27/3 |
| 2015/0013382 | A1 | 1/2015 | Murphy | |
| 2015/0320158 | A1* | 11/2015 | Duffy, Jr. | B22F 7/08 419/10 |
| 2016/0137839 | A1* | 5/2016 | Rolland | G03F 7/00 522/71 |
| 2017/0135451 | A1* | 5/2017 | Christensen | C04B 26/14 |
| 2017/0254108 | A1 | 9/2017 | Armstrong | |

* cited by examiner

METHOD OF MANUFACTURING JEWELRY WITH ARTIFACTS SUCH AS CREMATION ASHES EMBEDDED THEREIN

FIELD OF THE INVENTION

The invention relates to a method of manufacturing jewelry with remains of a deceased entity, such as cremains, hair, nails, and/or fur, embedded therein. The invention also relates to jewelry made according to the method. More specifically, the invention relates to mementos for recalling and respecting loved ones who have passed.

BACKGROUND OF THE INVENTION

There has long been a demand for mementos or keepsakes to allow survivors to feel close to and recall memories of loved ones, including pets, who are no longer with us.

Various devices and methods have been originated for preserving physical remains from the body of the deceased in locations closer to the survivors than a traditional human or pet cemetery. For example, cremains (the material remaining after a body is cremated) may be placed in decorative urns and maintained in the survivor's household. Other efforts have led to devices that allow the deceased's ashes to be housed in a piece of jewelry or the like. For instance, locket compartments have been manufactured which are designed to carry a small quantity of cremains and display them so they can be viewed.

One prior art approach utilized a jewelry piece having a recessed portion or empty chamber of the type typically intended to hold a gemstone (such as the space enclosed by a walled bezel). A craftsperson would fill the recess with a mixture of UV resin and remains, stirred together, in a single layer; and would then expose the filled recess to ultraviolet light for sufficient time to cure the resin. The UV-hardened resin thus substituted for a gemstone in the jewelry item and allowed wearing a portion of the remains as though wearing a fashion item. However, the inventor discovered that this method resulted in a product which was not as resistant to daily wear as desired and did not permit desirable artistry.

In accordance with the invention there is provided a method which results in a product that is stable, resistant to daily wear, and that permits an aesthetically pleasing arrangement of the cremains or other content. From an artistic perspective, the method described herein allows the maker to control placement of the materials that will be enclosed by the resin, so as to achieve a desired aesthetic effect.

SUMMARY OF THE INVENTION

In accordance with the invention, a method of manufacturing jewelry, incorporating part of the body, or one or more mementos, of a deceased entity (which may be a human or a pet or other formerly living entity), such as cremains, hair, fur, or nails (all such body parts and mementos collectively referred to hereafter as "remains") includes providing a jewelry blank (such as a jewelry mount or setting) having a gem holding region. The gem holding region preferably is recessed and may be a walled area such as a walled bezel (all of these gem holding regions being collectively referred to hereafter as a "chamber"). The method further includes placing a portion of UV-curable resin (UV resin) within the chamber. The resin may be clear or may be colored, and in either case, dye may be added as desired to achieve a preferred coloration or artistic effect. Selected pieces of remains (for example, larger pieces of solid cremains) are placed on and/or within this first resin layer and may, if desired, be arranged in an artistic pattern. Heat, typically by means of a flame, may be applied to the first layer to facilitate the escape of any entrapped gas bubbles. The first layer is then exposed to a source of ultraviolet light for a time sufficient to cure the first layer—that is, until the resin becomes substantially hard to touch. Although multiple sources of ultraviolet radiation, including sunlight, could be used for this curing process, it is preferable to use a lamp which achieves curing of the selected UV resin within about 10 minutes. Thereafter a second layer of resin and, preferably, remains is formed and cured in the same fashion. Heat may again be applied to facilitate the escape of entrapped bubbles. Thereafter, a final layer of resin is added and cured in similar fashion to the first two layers except that the final layer typically does not contain remains. The final layer gives an extra tough quality and extra durability. Optionally, diamond dust or another such reflective substance ("sparkling element") may be sprinkled on the surface of the penultimate layer prior to constructing the final layer, to give a sparkling effect to the final resin "gem." Alternatively, the sparkling element may be added on top of or within an earlier layer, or omitted altogether. In one specific embodiment, the first layer is placed within and fills about ⅖ of the empty space of a chamber, a second layer fills about ⅖ of the remaining space in the chamber and a third, final layer fills the rest of the chamber. The ratios are generally a rough guide and depend on the item being filled. More specifically, as the resin is cured by UV light, it is desirable to form each layer at a thickness that will harden within about ten minutes. The thickness of the layer is selected to permit such hardening. The ratios provided for purposes of the embodiment described herein are suitable for filing a typical jewelry blank of the type intended to be filled by a cabochon gemstone having a thickness that is not greater than approximately 5 mm. Most jewelry made according to the method for use with such jewelry blanks requires three layers in roughly the ratios stated. This process of forming sequential layers results in a much more durable and aesthetically pleasing gem piece than possible with the prior art described previously. While the use of cremation ashes ("cremains") is described herein, other remains may be used.

BRIEF DESCRIPTION OF THE DRAWINGS

Having briefly described the invention, the same will become better understood from the following detailed description made with reference to the attached Figures wherein.

DETAILED DESCRIPTION OF EXEMPLARY EMBODIMENTS

Figure 1:
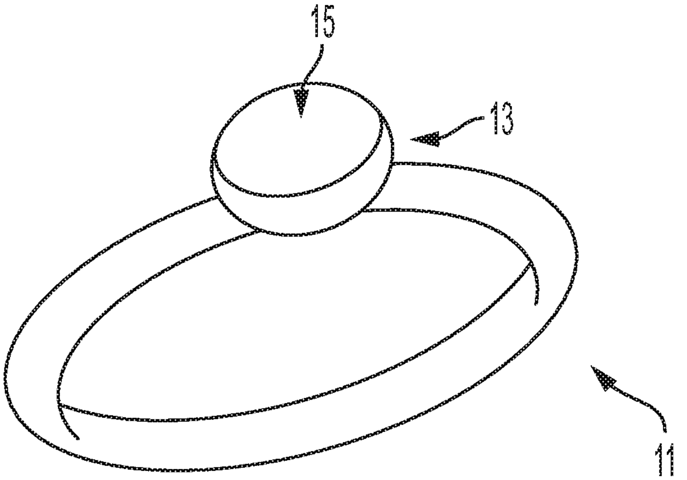
FIG. 1 is a schematic diagram of an article, for example, a jewelry blank (depicted as a finger ring) having a chamber (depicted as a walled bezel) within which the invention may be implemented.

FIG. 1 schematically illustrates a jewelry piece used for implementing the invention. While a jewelry blank in the form of a ring 11 is shown, it will be appreciated that in addition to a ring, the invention can implemented with other articles, for example pendants, necklaces, bracelets, charm beads, earrings, cufflinks, lockets and the like.

It will also be appreciated that the invention can be implemented on ornaments other than wearable jewelry, and that the ornaments preferably are but need not be made of metal. For example, a small heart-shaped ornament filled with resin and remains according to the method might be created to adorn a photo frame. Although described below with particular application to cremains, the remains may also be keepsakes having personal meaning such as sand, pieces of clothing, paper, flowers, etc.

In FIG. 1, there is shown a jewelry blank 11 in the form of a ring having a bezel, comprising a chamber 15, the exterior of which is defined by a wall 13, the chamber being used as described hereafter for the forming therein of a resin "gem," said gem incorporating remains, for example, cremation ashes.

Figure 2:
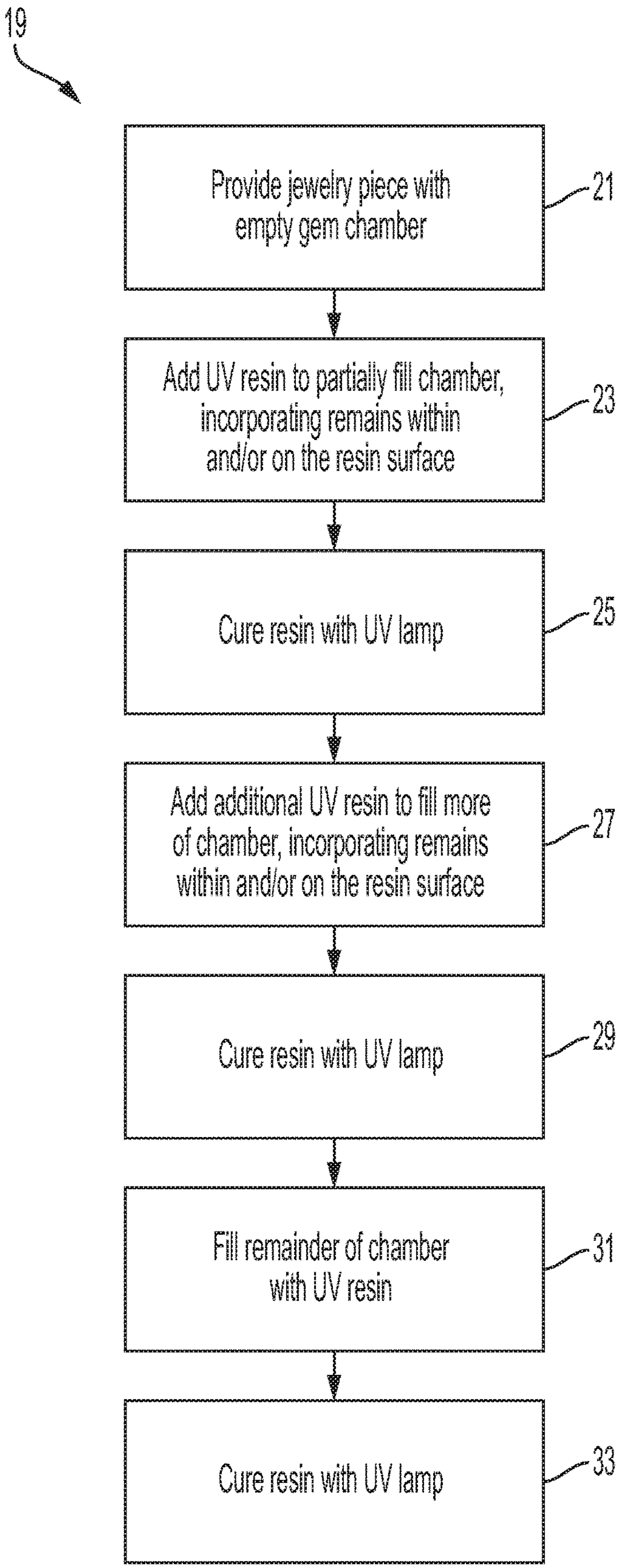
FIG. 2 is a block diagram illustrating the various steps of the method of the invention.

In the embodiment illustrated in FIG. 2, block diagram 19 shows a first step 21 wherein a "jewelry piece" (a jewelry blank 11 such as that shown in FIG. 1, for example, a ring having a walled bezel) is provided. In step 23, UV resin is added to partially fill the chamber 15. Remains are placed within and/or on the surface of the resin, allowing the maker to exercise artistic freedom in placement of the remains so as to create an aesthetically pleasing product. In a preferred embodiment, the first layer of resin is added to the chamber and pieces of the remains are placed on top of the resin. When cremains are used, for example, the cremains typically vary in shape, size, color, and weight, so that some of the pieces will float, while most sink into the resin. Use of cremains thus allows artistry on a three-dimensional level.

Any appropriate tool may be used to deposit the resin and the remains, as will be readily apparent to those of ordinary skill. Watchmakers' tools are frequently used, for example.

If the remains are cremains, they may be a mix of fine materials along with larger pieces of bone fragments. In that case, the cremains may be sifted to isolate larger pieces, which are particularly suited for artistic arrangement on and within this first layer. If other remains are used (for example, fur or hair), they likewise may be artistically placed within and on the surface of this first layer.

In a preferred embodiment, the amount of resin added for the first layer will fill about ⅖ of the interior of the chamber 15. However, as previously discussed, the amount of fill in each layer may vary as will be apparent to those of ordinary skill; and the ratios also may vary.

Preferably after the remains are placed on and within the resin and before proceeding to step 25, heat may be applied to the first layer to facilitate the escape of any entrapped gas bubbles, using methods known to those of ordinary skill. For example, the flame of a butane torch may be passed above the resin. Alternative methods for removal of bubbles known to those of ordinary skill could alternatively be utilized, or this bubble-removal step could be omitted.

At step 25, the first layer is cured with ultraviolet light, preferably using a UV lamp of sufficient intensity to cure the first layer promptly. Using readily-available UV resins and commercially available reasonably priced UV lamps, this process can typically be accomplished within about 10 minutes. It is noted that while a UV lamp is mentioned, sunlight also contains UV light and exposure to sunlight could be used to cure the resin. However, the intensity of ultraviolet light in sunlight is relatively low and would require a longer time to cure as compared to conventional existing UV lamps. Further, due to the long time required, there is a danger that the jewelry piece might shift, causing the resin and cremains to move before the resin is fully cured. In the context of the type of lamp used, in a specific embodiment it is a 36 W light box.

At step 27, additional UV resin is added to the partially filled chamber 15, to further fill the interior of chamber 15. In a preferred embodiment, the amount of UV resin added at this second stage will fill ⅖ of the remaining volume. In a preferred embodiment, a second quantity of remains is placed on and within the added resin of the second layer and is artistically arranged. Preferably, the escape of entrapped bubbles is facilitated as before, for example by applying heat using the flame of a butane torch. This second layer is then cured, preferably using the UV lamp as before, at step 29.

In a preferred embodiment, at step 31, a third and final layer of UV resin is added to the interior of chamber 15, in an amount sufficient to completely fill the chamber. In this preferred embodiment, no remains are added to the final layer. In this preferred embodiment, the final layer is approximately ⅕ of the thickness of the total resin thickness, which provides additional toughness to the finished gemstone and additional protection for the remains encapsulated in the lower layers. Preferably, the escape of entrapped bubbles is facilitated as before, for example by applying heat using the flame of a butane torch. At step 33, the final layer is then cured, preferably using the UV lamp as before.

As is well-known, resin does not inherently reflect light in the same manner as gemstones such as diamonds. Many jewelry customers, however, desire to have jewelry that sparkles. Therefore, in a preferred embodiment, the maker can add sparkle to the resin "gem" being created by the inventive method, by adding a reflective compound that will be encapsulated within the resin. Preferably, the reflective compound is diamond dust (which may be composed of real diamonds or may be synthetic). Alternative sparkling compounds include, for example, mica powder, plastic glitter dust, and glass glitter dust. Larger sparkling compounds may be used, recognizing that because of their size, they may conceal portions of the remains. Preferably, the diamond dust is sprinkled onto the top surface of the penultimate layer, after the second layer is cured, prior to adding the final layer of resin. For example, in the previously-described preferred embodiment consisting of three layers, diamond dust would be sprinkled onto the surface of the second layer of resin.

As may be appreciated, while the resin used may be clear, optionally a dyed resin may be used for some or all layers; and dye may be added to any layer. For example, the first two layers of resin may contain a specified color dye while the final layer may be clear allowing diamond dust, if used on the top surface of the second layer, to be more visible, and to give a subtle glint to the look of the item under bright daylight conditions. Similarly, a tie-dye effect can be obtained by swirling one or more dye colors into the resin of one or more layers.

The invention has been described in terms of a preferred embodiment wherein the chamber 15 is a walled bezel. However, many alternative chambers suitable for practicing the method of the invention are known to those of ordinary skill and may be utilized.

It has been found that the method described herein may occasionally result in a substantially flat-topped "gem" that rises no higher than the chamber sidewalls. While this final substantially flat resin layer is sufficient for structural purposes, it may be preferable to have a more domed surface. In such cases, an additional resin layer can be added above what otherwise would be the final layer by dropping a small amount of resin (akin to a droplet of water, for a small jewelry item) into the center of the flat layer. The viscosity of the resin typically will cause the resin of this small quantity to flow slowly outward but to not flatten entirely, thereby forming a dome. Care needs to be taken to ensure the jewelry item is flat and level both when pouring and during curing; otherwise the dome can be tilted and off center.

In terms of UV resins used, they are well known and conventional, often comprised of monomeric styrene and oligomeric acrylates. The embodiments described herein utilize the type of resin known as a "hard" UV resin, and more particularly utilize the type known as a "thick" type of hard UV resin. As known to those of ordinary skill, such resins have a relatively high viscosity and thus a low flow rate, which facilitates the doming effect described above; and cure to form a hard "gem" that is resistant to damage.

Having thus described the invention in detail, the same will become better understood from the appended claims in which it is set forth in a non-limiting manner.

The invention claimed is:

1. A method of manufacturing jewelry incorporating remains, comprising:

a) providing a jewelry blank having a chamber;

b) placing an amount of UV resin within the chamber to partially fill the chamber and form a first layer;

c) placing selected remains in at least one of the following locations:

(i) the interior of the UV resin of the first layer;

(ii) the surface of the UV resin of the first layer;

d) curing the first layer by exposing it to ultraviolet light for a time sufficient to cure the UV resin of the first layer;

e) placing an amount of UV resin within the chamber to partially fill the chamber and form a second layer;

f) curing the second layer by exposing it to ultraviolet light for a time sufficient to cure the UV resin of the second layer;

g) placing an amount of UV resin within the chamber to complete the filling of the chamber and form a final layer;

h) curing the final layer by exposing it to ultraviolet light for a time sufficient to cure the UV resin of the final layer.

2. The method of claim 1, wherein said remains comprise cremains.

3. The method of claim 1, wherein said remains comprise hair or fur.

4. The method of claim 1, further comprising placing selected remains in at least one of the following locations:

(i) the interior of the UV resin of the second layer;

(ii) the surface of the UV resin of the second layer.

5. The method of claim 1, further comprising adding diamond dust to the surface of the second layer.

6. The method of claim 2, further comprising adding diamond dust to the top of the second layer prior to adding the final layer of resin.

7. The method of claim 1, further comprising adding a dye to the UV resin of at least one layer of the jewelry, prior to curing that UV resin.

8. The method of claim 1, further comprising allowing bubbles to escape from at least one layer of the jewelry by applying heat to the UV resin of the least one layer of the jewelry, prior to curing that UV resin.

9. The method of claim 1, wherein the ultraviolet light to which the first layer is exposed and the ultraviolet light to which the second layer is exposed is ultraviolet light of an intensity sufficient to cure the UV resin of that layer within about 10 minutes.

10. The method of claim 2 wherein the ultraviolet light to which each layer is exposed is ultraviolet light of an intensity sufficient to cure the UV resin of that layer within about 10 minutes.

* * * * *